Jan. 13, 1942.  P. C. YUHASE  2,269,616
MICROIMPRESSION TOOL
Filed Sept. 4, 1940

INVENTOR.
Peter C. Yuhase
BY

Patented Jan. 13, 1942

2,269,616

UNITED STATES PATENT OFFICE 2,269,616

MICROIMPRESSION TOOL

Peter C. Yuhase, Detroit, Mich.

Application September 4, 1940, Serial No. 355,314

2 Claims. (Cl. 81—1)

This invention relates to machine tools and more particularly to tools for use in the modern tool room of manufacturing plants which will overcome the usual guess work now necessary in the manufacture and assembly of such things as metal patterns, tools and dies, jigs and fixtures, die cast dies, engraving, die sinking, die cutting and general machine work, where in the past it has been necessary to use long and cumbersome methods in an attempt to solve the problem presented, and when the various operations were completed the operator was never sure if the results were accurate.

The present invention provides a new and improved, what will be hereinafter known as a microimpression tool. It may be used on any irregular surface, radius or contour where it is impossible to use a micrometer. The problem has been present for many years of finding an accurate and sure way to remove a predetermined amount of surface metal from either a flat, curve or irregular surface, so that when the metal has been removed it would be known for certain that the predetermined, desired amount has been taken off the surface. This tool has proven itself particularly useful in the automobile industry for use on fender forming dies when fitting in the punch portion of the dies and the metal therein has become torn or wrinkled and it is necessary to remove from the dies a certain amount of metal to make the die practical for use. This tool is provided with gauge means by which the user may accurately set before using, the amount of metal he desires to remove, whether the amount be one one-thousandth of an inch or one-half inch. Once the gauge means has been set the impression penetrating member of the tool will project beyond its housing to exactly the distance shown on the gauge and the operator has simply to tap the tool to drive the penetrating member into the metal to the desired depth, the mouth of the tool housing acting as a stop when that depth has been reached and after a number of these impressions have been made the surface containing the impressions is ground or filed off until all of the excess metal has been removed, the user determining the completion of the work when the bottom of the impressions have been reached.

The tool may also be used on die cast dies where the gate opening, flash line or air vent is laid out on a sweep or contour whether on a machine or bench, the operator following the same method outlined above. Also on die cast work as on automobile grilles where one wall thickness or rib may be heavier than the other, the die itself may easily be repaired by checking each rib or wall thickness of the casting to find the difference in uniformity. With this known the die may be made uniform by making an impression with the tool on the necessary ribs in the die and removing the excess metal to the bottom of the impression, thus saving hours of work and producing accurate results. The tool may further be used on a lathe shaper or milling machine where one must work to a template.

To sum up, the principal object of the present invention is to provide a new and improved microimpression tool which may be predeterminately set to remove the desired amount of surface metal on a plain or irregular surface.

The above and other objects will appear more clearly from the following more detailed description and from the drawing wherein Fig. 1 is a front elevation of the invention herein disclosed;

Figure 2:
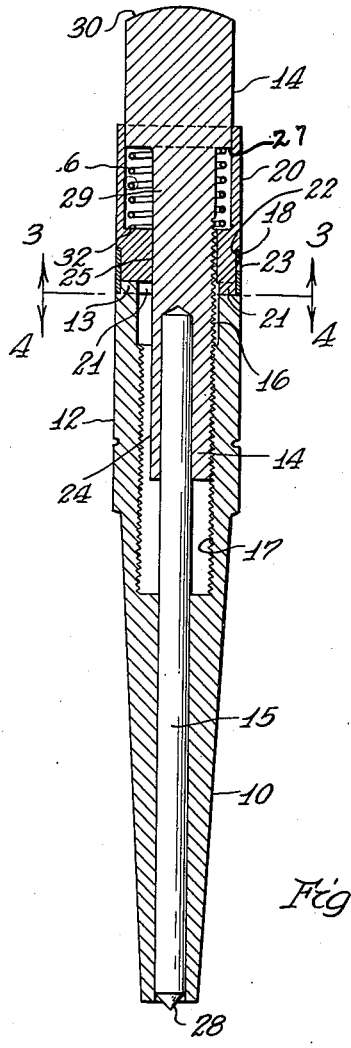
Fig. 2 is a section taken substantially on the line 2—2 of Fig. 1.
Figure 3:
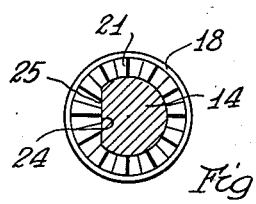
Fig. 3 is a section taken substantially on the line 3—3 of Fig. 2.
Figure 4:
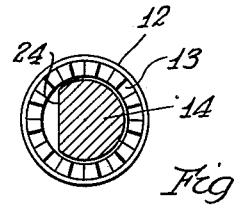
Fig. 4 is a section taken substantially on the line 4—4 of Fig. 2.

Referring now to the drawing. The microimpression tool is a built up structure which may be readily assembled; the same being manufactured of high grade tool steel; all parts being hardened and replaceable, the same being a precision tool to be used on precision work. The numeral 10 designates a punch barrel, the same being tapered at the lower end and hollow throughout and open at both ends. The upper portion of said barrel is formed in the manner of a band 12 and contains numerous indicia for a purpose later to be described. Immediately below said band 12 there is provided a knurled ring portion 11 for use as a finger grip to enable the operator to conveniently rotate or hold the barrel when using the punch. The upper annular periphery of band 12 is provided with a plurality of teeth 13, best shown in Figure 2 of the drawing, and the interior of barrel 10 has a portion of its inner surface screw threaded as at 17 for a purpose later to be described. The punch is built in two parts, the barrel portion having been described, the second part comprises an impression penetrating stem or pin 14 which consists of an enlarged tapping head 30. This head has a shoulder 27, and a reduced portion 29 which is threaded 16, said threads having a longitudinally filed flat surface 24 (Fig. 4) thereon, said reduced portion 29 being further reduced to form the lower penetrating portion of the stem 15. The lower end of the stem 15 is pointed 28 so that it will more easily enter the metal when the head 30 is tapped with a hammer. A setting collar 20 having an irregular opening 25 therein to permit the passage of reduced portion 29 of stem therethrough is provided, said collar having a portion 19 thereof knurled to provide an additional finger grip when setting the tool, and said collar having a reduced portion 22, which forms an annular flange, having a plurality of teeth 21 cut therein for a purpose later to be described. An adjusting ring 18 is also provided and is adapted to fit frictionally and rotatably on reduced portion 22 so that the ring will turn simultaneously with collar 20, when collar 20 is rotated; said ring 18 containing indicia and having a small pin hole opening 23 therethrough. A spring 26 is interposed between shoulder 27 and flange 32 disposed within setting collar 20.

The manner in which the micro punch tool is assembled is as follows:

The spring 26 is passed over point 28 of stem 15 and rides on reduced screw threaded portion 29 so that the upper end of the spring abuts against shoulder 27. Adjusting ring 18 is then pressed onto reduced portion 22 of setting collar 20 and the assembled collar is passed onto stem 14, the flat portion 24 of reduced portion 29 passing through the opening in the irregular flange 32 located in the lower portion of setting collar 20 so that the flat portion 24 of screw threaded stem 14 will correspond with the flat portion of the flange opening 23 in the lower portion of setting collar 20. In this way the setting collar 20 is allowed to ride vertically on screw threaded portion 16 and also when setting collar 20 is rotated either in a clockwise or counterclockwise direction, the entire penetrating stem 14 will also rotate. Stem pin portion 15 is then inserted into barrel 10 until the threaded portion 16 of stem 14 engages threaded portion 17 on the interior of barrel 10 and the spring 26 interposed between the tapping head 30 and the setting collar 20 will force setting collar 20 and reduced portion 22 containing teeth 21 into engagement with teeth 13 on the upper portion of barrel 10 so that said teeth remain normally in engagement. The tool is then ready for use.

Figure 1:
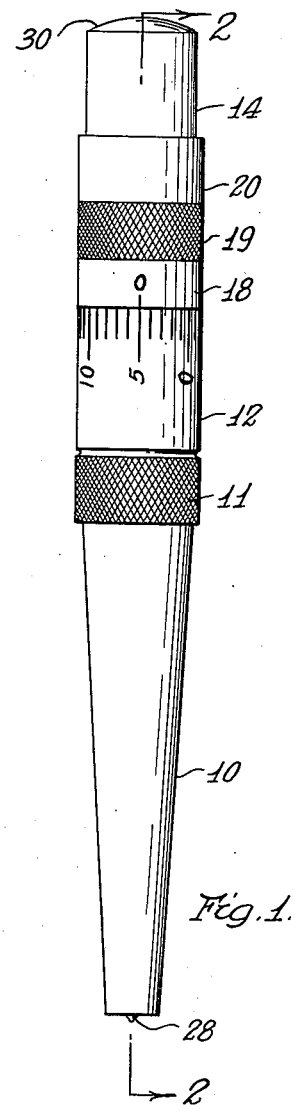

The manner in which the device operates is as follows:

The tool in its normal condition remains with the teeth 21 located in the setting collar and the teeth 13 on top of the barrel 10 in mesh, which forms a ratchet, and setting collar 20 may be rotated in either a clockwise or counterclockwise direction without lifting the same so that the teeth are out of engagement, or to set the tool, setting collar 20 may be raised and freely rotated. When the operator has determined the amount of stock he wishes to remove from the flat or irregular surface being worked upon, setting collar 20 is rotated until the zero on adjusting ring 18 corresponds with the zero on band 12 at top of barrel 10. Inasmuch as adjusting ring 18 rides frictionally on the reduced annular portion 22 of setting collar 20, said ring 18 will also rotate when setting collar 20 is rotated. Should the operator move setting collar 20 upwardly, it will be against pressure exerted by spring 26 which is interposed between annular flange 32 located within setting collar 20 and shoulder 27 of tapping head 30. The setting collar 20, being of greater diameter than tapping head 30, allows said setting collar to ride telescopically upon said tapping head. When zero indicia on adjusting ring 18 and band 12 are in alignment, point 28 on the end of penetrating pin stem 15 will be flush with the lower opening in barrel 10, if the tool is properly set. The operator, who has predetermined the amount of stock to be removed from the flat or irregular surface, then sets the tool by turning setting collar 20 in a clockwise direction until the zero on adjusting ring 18 corresponds with the indicia wanted on band 12 of barrel 10, as shown best in Fig. 1 of the drawing. As the setting collar 20 is moved in a clockwise direction, setting collar 20 being rotatably secured to penetrating pin stem 15 by means of the flat portion 24 on stem portion 14 and the flat portion located in flange 32, and inasmuch as the threads on stem portion 14 are in engagement with threads 17 located on the inner periphery of barrel 10, this clockwise movement is imparted to pin stem 15 and the point of the stem protrudes beyond the base of barrel 10, the distance marked on micrometer indicia band 12 on top of barrel 10. The flat portion 24 on the stem threads and the flat portion of flange 32 located in setting collar 20 also allows vertical movement of said collar on said stem at all times. Once the tool has been set either with or without lifting setting collar 20, the ratchet formed by means of the teeth above described in mesh, the setting picked by the operator will remain set during the punching operation. The operator then simply holds the tool, gripping the same by the knurled portion of barrel 10 and taps tapping head 30 with a hammer until penetrating stem 15 has entered the metal up to the base of barrel 10. The tool is then withdrawn and this operation is repeated the number of times desired to create a line or circle of penetrations. The surface metal is then filed or machined off until the penetrations are no longer visible and the user is then sure that the accurate amount of metal has been removed from the object being worked. To retract stem 15, it is simply necessary to turn setting collar 20 in a counterclockwise direction and penetrating stem will disappear within the barrel.

If at any time the impression penetrating punch should break or become exceptionally dull by use on a hardened surface, the operator has simply to unscrew the punch and regrind the penetrating stem 14 in the manner of regrinding any center punch, an operation well known to any tool or die maker; reassemble the tool and adjust same until point 28 extends approximately .002 beyond the bottom of barrel 10 (determine .002 by micrometer) and then by use of an oil stone, bring the point of the punch flush with the bottom of barrel 10; turn adjusting ring 18 so that the zero thereon corresponds with the zero band 12 at top of barrel 10 by means of inserting a one inch well-known micrometer wrench into opening 23 on adjusting ring 18 and inasmuch as ring 18 is frictionally and rotatably mounted on reduced portion 22 of setting collar 20, said ring may be rotated to the point above designated and the punch is again ready for use. It has been found in actual practice that it is best not to have penetrating stem 15 sharpened too highly, a semi-blunt point being preferred.

There has been herein provided a new and improved tool, simple in design yet practical for all types of tool room work where precision work is required and where in the past it was necessary for men, doing this type of work, to rely on guess work alone.

While there is shown and described satisfactory constructional examples embodying the principles of the present invention, it will be understood that many changes, variations and modifications may be resorted to without departing from such principles.

What I claim is:

1. A gauging tool including, in combination, a body having an end engageable with an element, and having a micrometer scale thereon, a pointed stem threaded in said body and projectable beyond the end thereof, a head on said stem by which it is struck to produce penetration, a collar on said stem longitudinally movable and non-rotatably related therewith, ratchet means between said collar and body to maintain them in set position and indicating means on said collar by which the stem is set relative to said body by its position relative to the micrometer setting.

2. A gauging tool including, in combination, a body having an end engageable with an element and having a micrometer scale thereon, a pointed stem threaded in said body and projectable beyond the end thereof, a head on said stem by which it is struck to produce penetration, a collar on said stem longitudinally movable and non-rotatably related therewith, ratchet means between said collar and body, indicating means on said collar by which the stem is set relative to said body by its position relative to the micrometer setting and spring means interposed between said head and said collar to maintain said ratchet means normally in interlocked relationship.

PETER C. YUHASE.